(12) United States Patent
Gan

(10) Patent No.: US 11,469,064 B2
(45) Date of Patent: Oct. 11, 2022

(54) FLASH DOUBLE-TEMPERATURE LINKAGE TEMPERATURE CONTROLLER

(71) Applicant: Yuebin Gan, Foshan (CN)

(72) Inventor: Yuebin Gan, Foshan (CN)

(73) Assignee: Yuebin Gan, Foshan (CN)

( * ) Notice: Subject to any disclaimer, the term of this patent is extended or adjusted under 35 U.S.C. 154(b) by 0 days.

(21) Appl. No.: 17/041,908

(22) PCT Filed: Mar. 5, 2019

(86) PCT No.: PCT/CN2019/076929
§ 371 (c)(1),
(2) Date: Sep. 25, 2020

(87) PCT Pub. No.: WO2019/196571
PCT Pub. Date: Oct. 17, 2019

(65) Prior Publication Data
US 2021/0134546 A1    May 6, 2021

(30) Foreign Application Priority Data

Apr. 12, 2018    (CN) .......................... 201810327655.8

(51) Int. Cl.
*H01H 37/00* (2006.01)
*H01H 37/52* (2006.01)
*H01H 37/26* (2006.01)

(52) U.S. Cl.
CPC .......... *H01H 37/006* (2013.01); *H01H 37/26* (2013.01); *H01H 37/52* (2013.01)

(58) Field of Classification Search
CPC ...... H01H 37/006; H01H 37/26; H01H 37/52; A47J 27/21083; A47J 27/21091; A47J 27/21108; A47J 2202/00

USPC ......................................... 337/360, 370, 363
See application file for complete search history.

(56) References Cited

U.S. PATENT DOCUMENTS

| | | | | | |
|---|---|---|---|---|---|
| 1,783,520 | A | * | 12/1930 | Pearce | H02J 7/22 361/25 |
| 2,409,420 | A | * | 10/1946 | Clark | D06F 75/26 337/365 |
| 2,641,681 | A | * | 6/1953 | Willman | A47J 31/20 337/341 |
| 2,740,864 | A | * | 4/1956 | Tsai | H01H 37/12 337/375 |

(Continued)

FOREIGN PATENT DOCUMENTS

| | | | | | |
|---|---|---|---|---|---|
| EP | | 587046 A1 | * | 3/1994 | ........... D06F 75/265 |
| GB | | 2170655 A | * | 8/1986 | ............. H01H 37/12 |

*Primary Examiner* — Anatoly Vortman
(74) *Attorney, Agent, or Firm* — Dentons Durham Jones Pinegar

(57) ABSTRACT

A flash double-temperature linkage temperature controller has an arrangement that enables contacts of two movable contact sheet sets and two static contact sheet sets to sequentially operate at different temperatures, and a desired fixed temperature difference is obtained. The two movable contact sheet sets are respectively connected to the two static contact sheet sets to control two electric heating tubes, so that the effect whereby two electric heating tubes (high power) work during water heating and a single electric heating tube (low power) works during heat preservation heating is achieved, and the working frequency of the high-power contact sets is greatly reduced.

7 Claims, 7 Drawing Sheets

(56) References Cited

U.S. PATENT DOCUMENTS

| | | | | |
|---|---|---|---|---|
| 2,987,607 | A * | 6/1961 | Paulin | H01H 37/52 219/442 |
| 3,194,927 | A * | 7/1965 | Place | H01H 37/48 337/387 |
| 3,236,977 | A * | 2/1966 | Huffman | H01H 37/52 337/354 |
| 3,354,278 | A * | 11/1967 | Piacent | H01H 37/14 337/84 |
| 3,364,323 | A * | 1/1968 | Arlin | H01H 37/52 200/DIG. 46 |
| 3,425,016 | A * | 1/1969 | Meyers | A47J 31/053 337/68 |
| 3,774,012 | A * | 11/1973 | Vogel | F24C 7/081 219/512 |
| 3,964,004 | A * | 6/1976 | Mertler | H01H 35/14 200/DIG. 42 |
| 4,090,166 | A * | 5/1978 | Burch | H01H 37/12 337/299 |
| 4,109,225 | A * | 8/1978 | Hollweck | H01H 37/002 337/338 |
| 4,249,154 | A * | 2/1981 | Grable | H01H 37/12 337/299 |
| 4,345,389 | A * | 8/1982 | Balchunas | G05D 23/275 38/77.83 |
| 4,633,238 | A * | 12/1986 | Goessler | H05B 1/0216 219/512 |
| 4,704,595 | A * | 11/1987 | Essig | H01H 37/52 337/102 |
| 4,720,696 | A * | 1/1988 | Oldani | H01H 37/22 337/368 |
| 4,899,124 | A * | 2/1990 | Hollweck | H01H 37/002 337/299 |
| 4,968,963 | A * | 11/1990 | DeWitt | H01H 9/16 337/368 |
| 5,973,586 | A * | 10/1999 | Mertler, Jr. | H01H 37/02 337/299 |
| 6,639,504 | B2 * | 10/2003 | Eberl | H01H 37/002 337/414 |
| 7,741,947 | B2 * | 6/2010 | Tateishi | H01H 37/12 337/360 |
| 2021/0134546 | A1 * | 5/2021 | Gan | A47J 27/21083 |

* cited by examiner

FLASH DOUBLE-TEMPERATURE LINKAGE TEMPERATURE CONTROLLER

TECHNICAL FIELD

The present disclosure relates to a flashing thermostat, in particular to a flash double-temperature linkage temperature controller.

BACKGROUND

Common flashing adjustable thermostat of model KST is a thermostat using a temperature sensing bimetallic strip as the temperature sensing element. The bimetallic strip is bent and deformed due to temperature changes, which then causes flashing closure or separation of the movable contact and the fixed contact. Referring to FIG. 1, the common flashing adjustable thermostat includes a bottom plate, a ceramic ring, a bimetallic strip, a movable contact piece set, a fixed contact piece set, and a temperature regulating mechanism and the like. The bimetallic strip, the ceramic ring, the fixed contact piece set, the movable contact piece set and the temperature regulating mechanism are sequentially arranged on the bottom plate through a rivet from top to bottom. The rivet, which is also an installation seat, is penetrated by a screw from the bottom thereof so as to install the thermostat at a temperature measuring part of an electric heating appliance.

Referring to FIG. 2, which is a schematic view of a circuit connection of a traditional electric kettle with a single heating element installed with a flashing adjustable thermostat, the electric kettle realizes functions of temperature regulation and heat preservation through the flashing adjustable thermostat of model KST. However, the technical scheme is defective in terms of the following aspects:

1. Low power: such an electric kettle typically has a low power as the flashing adjustable thermostat is not suitable for large current loads due to the fact that the resistivity of the spring strip in the thermostat is relatively large.

2. Short service life: for ordinary electric kettles, each time the water is boiled, the contacts are switched on and off once, while for the electric kettle with a flashing adjustable thermostat of model KST, it will frequently activate the contacts in the thermostat during the heat preservation process, and for each activation, it operates at full power, which leads to a greatly reduced service life of the entire electric kettle as the service life of the contacts is limited.

3. Large noise: traditional electric kettles with a single-circuit thermostat, once activated, operate at full power with a loud sound from the boiling water, which is particularly obvious when using the heat preservation function at night.

SUMMARY

The disclosure aims at providing a flash double-temperature linkage temperature controller, which has high power, low noise, and long service life.

The technical scheme adopted by the disclosure for solving the technical problem is as follows.

There is provided a flash double-temperature linkage temperature controller, including a mounting plate and a mounting post arranged on the mounting plate. A temperature sensing bimetallic strip, a first ceramic ring, a first fixed contact piece set, a second ceramic ring, a first movable contact piece set, a third ceramic ring, a second fixed contact piece set, a fourth ceramic ring, a second movable contact piece set and a fifth ceramic ring are sequentially arranged on the mounting post from top to bottom. A first ceramic post is connected between an end of the temperature sensing bimetallic strip and an end of the first movable contact piece set, and a second ceramic post is connected between the end of the first movable contact piece set and an end of the second movable contact piece set. A temperature regulating mechanism, with a top abutting against a middle of the second movable contact piece set, is arranged on the mounting plate. A linkage rod is provided between the first movable contact piece set and the second movable contact piece set.

In the disclosure, the first movable contact piece set is connected with the second movable contact piece set through a conducting strip.

In the disclosure, the temperature regulating mechanism includes an insulating ejector rod, an adjusting screw for pushing the insulating ejector rod to move up and down, the insulating ejector rod has a top abutting against the second movable contact piece set, and the second movable contact piece set is provided with a positioning recess corresponding to the top of the insulating ejector rod.

In the disclosure, one end of the linkage rod protrudes outward and the other end of the linkage rod is recessed inward, the second movable contact piece set is provided with a positioning protrusion corresponding to a recessed portion of the linkage rod, the first movable contact piece set is provided with a positioning recess corresponding to a protruding portion of the linkage rod.

In the disclosure, one end of the first ceramic post is connected with the temperature sensing bimetallic strip, and the other end of the first ceramic post is connected with the second ceramic post by penetrating through the end of first movable contact piece set.

In the disclosure, the linkage rod has a hollow interior.

In the disclosure, the second ceramic post includes a fixed portion and a movable portion with an adjustable length.

The disclosure has the beneficial effects as follows. In the disclosure, by changing the traditional single circuit to a double circuit, connecting two sets of movable and fixed contact piece sets through the linkage rod and the second ceramic post, and designing the height of the second ceramic post, contacts of the two sets of movable and fixed contact piece sets can be operated successively at different temperatures, so that the required fixed temperature difference can be obtained. The two sets of movable and fixed contact piece sets are respectively connected with and control two electric heating tubes, thus achieving the effect of double electric heating tubes (high power) operating during heating and single electric heating tube (low power) operating during heat preservation, greatly reducing the operating times of the high power contact piece set, i.e., greatly improving the service life of the electric kettle. Furthermore, the low-power electric heating tube operates with a low noise, so that it is silent or has a micro-sound during heat preservation. Meanwhile, the double circuit is also beneficial for manufacturing a high-power electric heating appliance.

BRIEF DESCRIPTION OF THE DRAWINGS

The disclosure is further illustrated in the following description with reference to the embodiments and the accompanying drawings, in which.

DETAILED DESCRIPTION OF THE EMBODIMENTS

Figure 1:
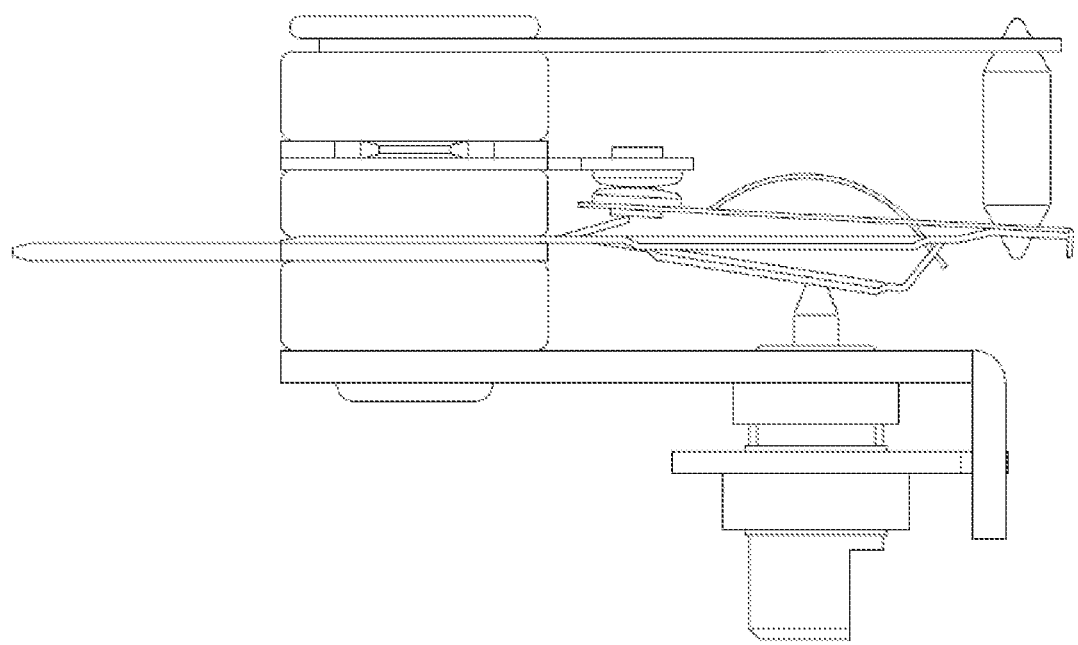
FIG. 1 is a schematic view illustrating a structure of a conventional flashing thermostat.
Figure 2:
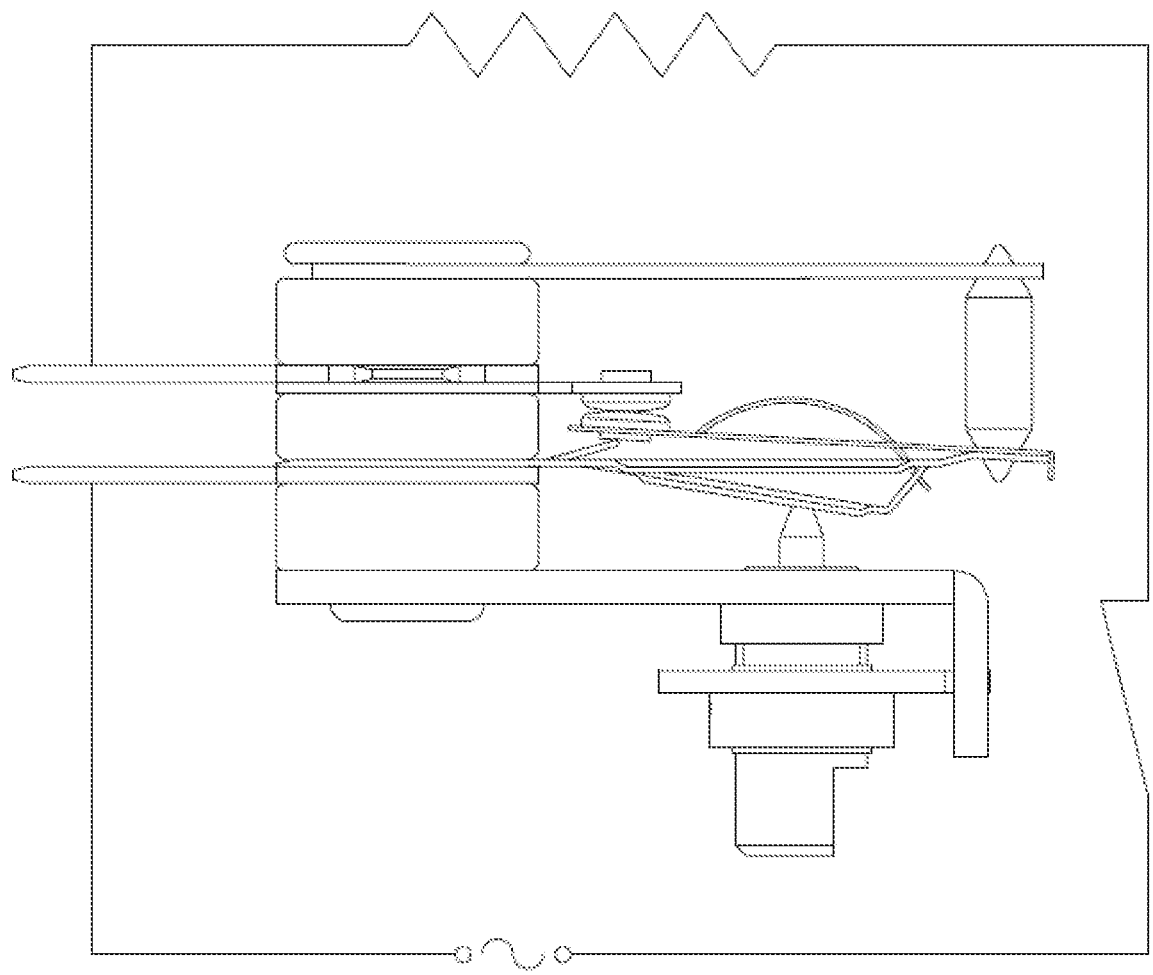
FIG. 2 is a schematic view illustrating a connection between the conventional flashing thermostat and an electric kettle.
Figure 3:
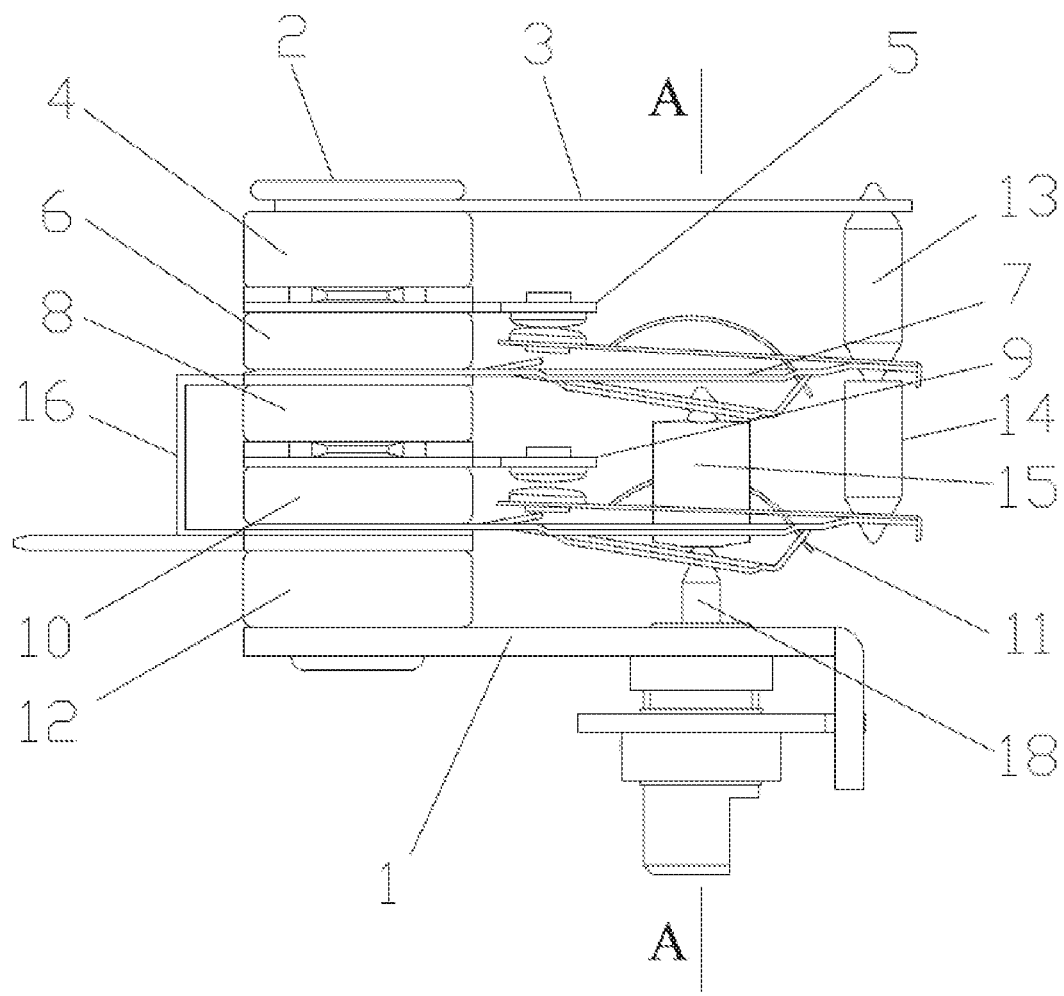
FIG. 3 is a schematic view illustrating a structure of the present embodiment.
Figure 4:
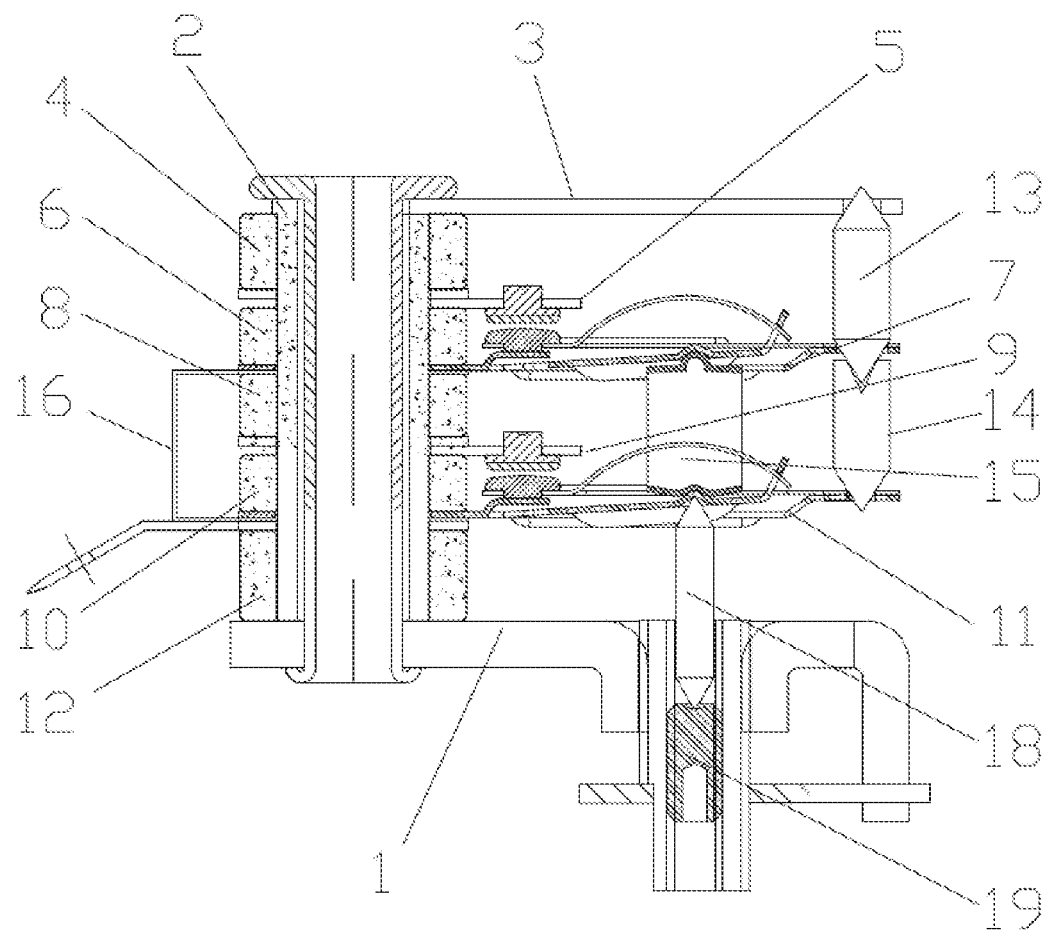
FIG. 4 is a cross-sectional view of FIG. 3.
Figure 5:
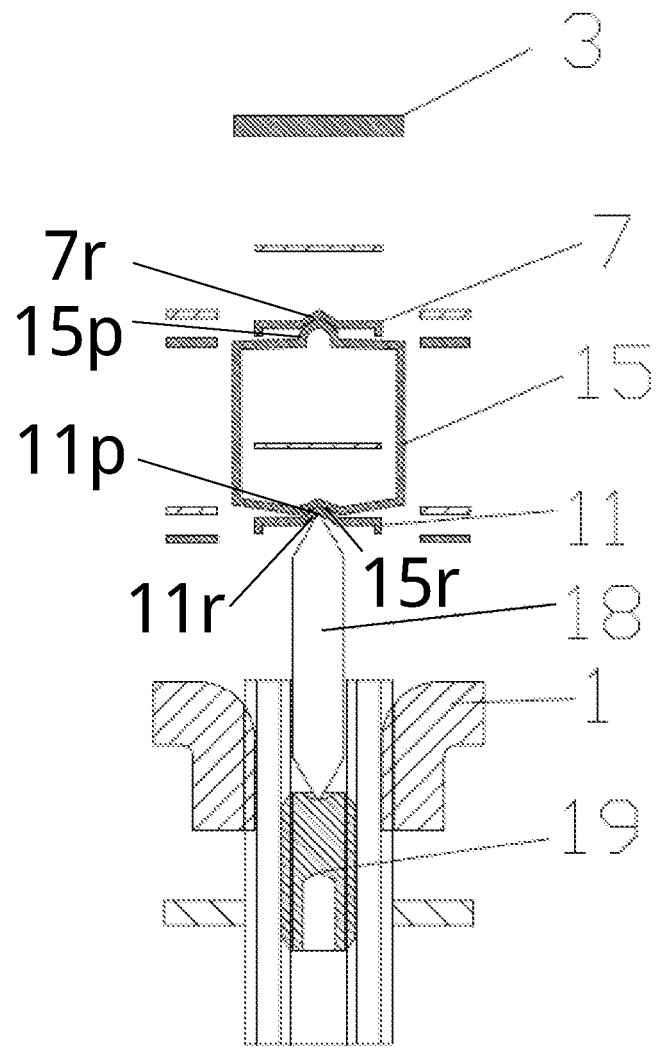
FIG. 5 is a cross-sectional view taken along line A-A of FIG. 3.
Figure 6:
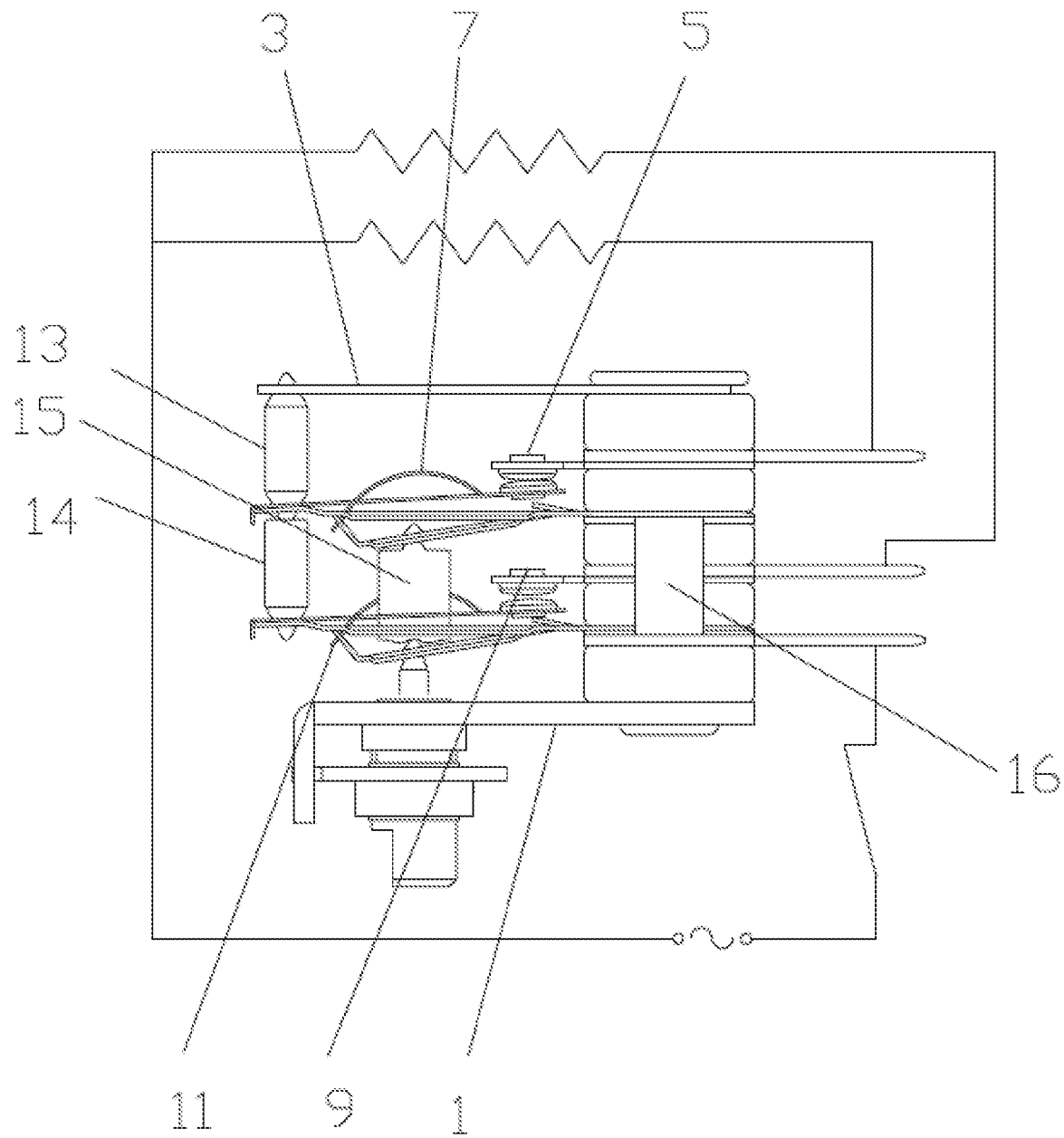
FIG. 6 is a schematic view illustrating a structure of the present embodiment, when wired.

Referring to FIG. 3 to FIG. 7, a flash double-temperature linkage temperature controller is provided according to the present embodiment, which includes a mounting plate 1 and a mounting post 2 arranged on the mounting plate 1. A temperature sensing bimetallic strip 3, a first ceramic ring 4, a first fixed contact piece set 5, a second ceramic ring 6, a first movable contact piece set 7, a third ceramic ring 8, a second fixed contact piece set 9, a fourth ceramic ring 10, a second movable contact piece set 11 and a fifth ceramic ring 12 are sequentially arranged on the mounting post 2 from top to bottom and are fixed by the mounting post 2 which is also a rivet. The ceramic rings above may be replaced by other insulating materials, and have the same technical effect. The movable and fixed contact piece sets are of an existing structure, the fixed contact piece set includes a fixed contact, and the movable contact piece set includes a movable contact, an upper leaf spring and a lower leaf spring, which are not described in detail herein. A first ceramic post 13 is connected between an end of the temperature sensing bimetallic strip 3 and an end of the first movable contact piece set 7, and a second ceramic post 14 is connected between the end of the first movable contact piece set 7 and an end of the second movable contact piece set 11. The first ceramic post 13 may also be replaced by other insulating materials and have the same technical effect. The second ceramic post 14 may also be replaced by a metal conductor without affecting the technical effect thereof. A temperature regulating mechanism with a structure substantially the same as the traditional structure is arranged on the mounting plate 1, which includes an insulating ejector rod 18, an adjusting screw 19 for pushing the insulating ejector rod 18 to move up and down, and an adjusting knob located outside. Rotation of the adjusting knob drives the insulating ejector rod 18 to move up and down. The insulating ejector rod 18 has a top abutting against a middle of the second movable contact piece set 11, and the second movable contact piece set 11 is provided with a positioning recess 11*r* corresponding to the top of the insulating ejector rod 18 to prevent the insulating ejector rod 18 from deviating. A linkage rod 15 is provided between the first movable contact piece set 7 and the second movable contact piece set 11. The linkage rod 15 is arranged directly above the insulating ejector rod 18 such that the linkage rod 15 is moved up and down as the insulating ejector rod 18 moves up and down, realizing that one temperature regulating mechanism simultaneously regulates two sets of movable and fixed contact piece sets with a constant temperature difference between each other.

As a preferred embodiment, the first fixed contact piece set 5 and the second fixed contact piece set 9 are respectively provided with a lug, the first movable contact piece set 7 and the second movable contact piece set 11 are respectively provided with a lug and are connected with each other through a conducting strip 16. Only one lug is needed to be kept to facilitate wiring. For similar consideration, two power lines may also be directly connected to the lugs of the first movable contact piece set 7 and the second movable contact piece set 11, which has the same technical effect.

In this embodiment, one end of the linkage rod 15 protrudes outward and the other end of the linkage rod 15 is recessed inward. The second movable contact piece set 11 is provided with a positioning protrusion 11*p* corresponding to a recessed portion 15*r* of the linkage rod 15, the first movable contact piece set 7 is provided with a positioning recess 7*r* corresponding to a protruding portion 15*p* of the linkage rod 15, and the linkage rod 15 can be prevented from deviating by the positioning protrusion 11*p* and the positioning recess 7*r*. The linkage rod 15 may be an insulating solid and has a hollow interior, thereby reducing the weight and improving the sensitivity. The linkage rod 15 may also be a conductive solid, so that the current in the first movable contact piece set 7 and the second movable contact piece set 11 can be shunted to adapt to higher power and prolong the service life.

Figure 7:
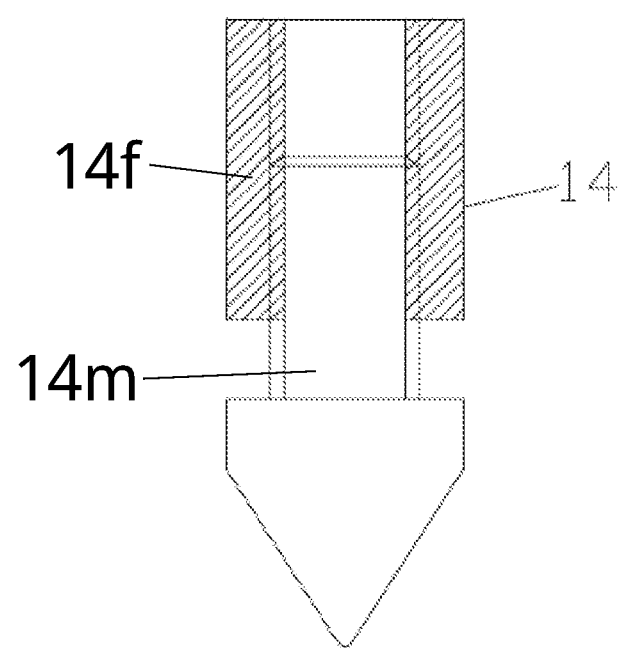
FIG. 7 is a schematic view illustrating a structure of a second ceramic post.

In this embodiment, both ends of the first ceramic post 13 are formed as a protruding pointed cone, in which one end is inserted into the temperature sensing bimetallic strip 3 and the other end is connected with the second ceramic post 14 by penetrating through the end of first movable contact piece set 7. One end of the second ceramic post 14 is formed as a recessed counter bore into which the end of the first ceramic post 13 is inserted, and the other end of the second ceramic post 14 is formed as a protruding pointed cone and is inserted into the end of the second movable contact piece set 11. During manufacturing, a relative distance between the first movable contact piece set 7 and the second movable contact piece set 11 may be adjusted by using the second ceramic post 14 with different lengths so as to meet the requirements of different temperature differences. Referring to FIG. 7, as a preferred embodiment, the second ceramic post 14 includes a fixed portion 14*f* and a movable portion 14*m* with an adjustable length, so that the height of the second ceramic post 14 is adjustable. The movable portion 14*m* may be an adjusting screw, and different temperature differences can be adjusted by adjusting the length of the adjusting screw.

The operating principle of the disclosure is described hereinafter. A side where the temperature sensing bimetallic strip 3 is located is tightly attached to the bottom of a heating appliance, the first movable and fixed contact piece sets and the second movable and fixed contact piece sets are respectively connected with a high-power electric heating tube and a low-power electric heating tube, and disconnection temperature difference between two sets of the movable and fixed contact piece sets is assumed to be 5° C. If we need to use water with temperature of 65° C., the temperature for disconnecting the contacts in the high-power circuit may be set to be 60° C. by the temperature regulating mechanism and the temperature for resetting (i.e., closing) the contacts in the high-power circuit may be set to be 57° C. Accordingly, the temperature for disconnecting the contacts in the lower-power circuit may be set to be 65° C. and the temperature for resetting (i.e., closing) the contacts in the lower-power circuit may be set to be 62° C. In this way, two electric heating tubes (high-power and low-power) operate simultaneously to heat water from room temperature to 60° C., which has a high heating speed, and then the low-power electric heating tube operates to heat the water from 60° C. to 65° C. After that, the heat preservation between 62° C. and 65° C. is realized by operating the low-power electric heating tube, which is low in preservation noise, even almost silent. In this way, it is not necessary for the high-power contact piece set to operate frequently, which improves the service life of the electric kettle. If we need to boil the water, the temperature for disconnecting the contacts in the high-power circuit may be set to be more than 100° C. by the temperature regulating mechanism, while the temperature for disconnecting the contacts in the low-power circuit may be set to be higher. In this way, two electric heating tubes (high-power and low-power) operate simultaneously to boil water, which has a fast heating speed. After the water is boiled, the power supply may be cut off by a steam switch provided separately in the electric kettle.

The above description is only preferred embodiments of the present disclosure, and technical solutions that can achieve the object of the present disclosure by substantially the same means shall all fall within the protection scope of the present disclosure.

The invention claimed is:

1. A flash double-temperature linkage temperature controller, comprising a mounting plate and a mounting post arranged on the mounting plate, wherein, a temperature sensing bimetallic strip, a first ceramic ring, a first fixed contact piece set, a second ceramic ring, a first movable contact piece set, a third ceramic ring, a second fixed contact piece set, a fourth ceramic ring, a second movable contact piece set and a fifth ceramic ring are sequentially arranged on the mounting post from top to bottom, a first ceramic post is connected between an end of the temperature sensing bimetallic strip and an end of the first movable contact piece set, and a second ceramic post is connected between the end of the first movable contact piece set and an end of the second movable contact piece set, a temperature regulating mechanism, with a top abutting against a middle of the second movable contact piece set, is arranged on the mounting plate, a linkage rod is provided between the first movable contact piece set and the second movable contact piece set.

2. The flash double-temperature linkage temperature controller of claim 1, wherein the first movable contact piece set is connected with the second movable contact piece set through a conducting strip.

3. The flash double-temperature linkage temperature controller of claim 1, wherein the temperature regulating mechanism comprises an insulating ejector rod, an adjusting screw for pushing the insulating ejector rod to move up and down, the insulating ejector rod has a top abutting against the second movable contact piece set, and the second movable contact piece set is provided with a positioning recess corresponding to the top of the insulating ejector rod.

4. The flash double-temperature linkage temperature controller of claim 1, wherein one end of the linkage rod protrudes outward and the other end of the linkage rod is recessed inward, the second movable contact piece set is provided with a positioning protrusion corresponding to a recessed portion of the linkage rod, and the first movable contact piece set is provided with a positioning recess corresponding to a protruding portion of the linkage rod.

5. The flash double-temperature linkage temperature controller of claim 1, wherein one end of the first ceramic post is connected with the temperature sensing bimetallic strip, and the other end of the first ceramic post is connected with the second ceramic post by penetrating through the end of the first movable contact piece set.

6. The flash double-temperature linkage temperature controller of claim 1, wherein the linkage rod has a hollow interior.

7. The flash double-temperature linkage temperature controller of claim 1, wherein the second ceramic post comprises a fixed portion and a movable portion with an adjustable length.

* * * * *